US009565001B2

(12) United States Patent
Pande et al.

(10) Patent No.: US 9,565,001 B2
(45) Date of Patent: Feb. 7, 2017

(54) GUARD SUBCARRIER PLACEMENT IN AN OFDM SYMBOL USED FOR SYNCHRONIZATION

(75) Inventors: Tarkesh Pande, Dallas, TX (US); Eko N. Onggosanusi, Allen, TX (US); Anand G. Dabak, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 2581 days.

(21) Appl. No.: 12/129,932

(22) Filed: May 30, 2008

(65) Prior Publication Data

US 2008/0298326 A1 Dec. 4, 2008

Related U.S. Application Data

(60) Provisional application No. 60/941,528, filed on Jun. 1, 2007, provisional application No. 60/946,283, filed on Jun. 26, 2007.

(51) Int. Cl.
*H04L 5/00* (2006.01)
*H04L 27/26* (2006.01)
*H04J 11/00* (2006.01)

(52) U.S. Cl.
CPC .......... *H04L 5/0048* (2013.01); *H04J 11/0069* (2013.01); *H04L 5/0053* (2013.01);
(Continued)

(58) Field of Classification Search
CPC ... H04J 11/0069; H04L 5/0007; H04L 5/0023; H04L 5/0048; H04L 5/0053; H04L 5/0092; H04L 27/2613; H04L 27/2626; H04L 27/2655; H04L 27/2657; H04L 27/2675; H04L 5/0044; H04L 27/2602; H04L 27/2666
See application file for complete search history.

(56) References Cited

U.S. PATENT DOCUMENTS

2003/0210646 A1* 11/2003 Ohseki et al. ................ 370/203
2004/0135723 A1* 7/2004 Nakaya et al. ............... 342/372
(Continued)

FOREIGN PATENT DOCUMENTS

KR  10-2007-0050358 A  5/2007
WO  2007-050921 A2  5/2007

OTHER PUBLICATIONS

"SFN Synchronization Without BCH Bits for LTE", Sharp, 3GPP Draft, R1-071493, 3rd Generation Partnership Project (3GPP), Mobile Competence Centre, vol. RAN WG1, Apr. 3, 2007, pp. 1-13, XP050105426, Sophia-Antipolis Cedex, France.
(Continued)

*Primary Examiner* — Yee Lam
(74) *Attorney, Agent, or Firm* — Ronald O. Neerings; Charles A. Brill; Frank D. Cimino

(57) ABSTRACT

Embodiments of the present disclosure provide a transmitter, a receiver and methods of operating a transmitter and a receiver. In one embodiment, the transmitter is for use with a base station in a cellular communication system and includes a partitioning unit configured to provide first and second groups of guard subcarriers that partition a synchronization portion from data portions in a downlink synchronization signal. The transmitter also includes a transmit unit configured to transmit the downlink synchronization signal. Additionally, the receiver is for use with user equipment in a cellular communication system and includes a receive unit configured to receive a downlink synchronization signal. The receiver also includes a processing unit configured to provide a synchronization portion based on employing first and second groups of guard subcarriers that partition the synchronization portion from data portions of the downlink synchronization signal.

54 Claims, 5 Drawing Sheets

(52) U.S. Cl.
CPC ...... *H04L 27/2613* (2013.01); *H04L 27/2626* (2013.01); *H04L 27/2655* (2013.01); *H04L 27/2675* (2013.01); *H04L 5/0007* (2013.01); *H04L 5/0023* (2013.01); *H04L 5/0092* (2013.01); *H04L 27/2657* (2013.01)

(56) References Cited

U.S. PATENT DOCUMENTS

| | | | |
|---|---|---|---|
| 2004/0151109 A1* | 8/2004 | Batra et al. | 370/208 |
| 2006/0056540 A1* | 3/2006 | Magee | 375/299 |
| 2006/0171354 A1* | 8/2006 | Tee et al. | 370/329 |
| 2007/0015482 A1* | 1/2007 | Suominen | 455/313 |
| 2007/0147226 A1* | 6/2007 | Khandekar et al. | 370/208 |
| 2007/0183307 A1* | 8/2007 | Akita | H04J 11/0073 370/208 |
| 2007/0190967 A1* | 8/2007 | Cho et al. | 455/403 |
| 2007/0248068 A1* | 10/2007 | Onggosanusi et al. | 370/338 |
| 2008/0107191 A1* | 5/2008 | Ishii | 375/260 |
| 2008/0232510 A1* | 9/2008 | Golitschek Edler Von Elbwart et al. | 375/298 |
| 2009/0219802 A1* | 9/2009 | Han et al. | 370/210 |
| 2009/0268602 A1* | 10/2009 | Han et al. | 370/208 |
| 2011/0077015 A1* | 3/2011 | Saily et al. | 455/450 |

OTHER PUBLICATIONS

"Secondary Synchronisation Codes for LTE Cell Search", NEC Group. 3GPP Draft, R1-072110, 3rd Generation partnership Project (3GPP), Mobile Competence Centre, vol. RAN WG1, May 2, 2007, pp. 1-22, XP050105859, Sophia-Antipolis Cedex, France.

* cited by examiner

GUARD SUBCARRIER PLACEMENT IN AN OFDM SYMBOL USED FOR SYNCHRONIZATION

CROSS-REFERENCE TO PROVISIONAL APPLICATION

This application claims the benefit of U.S. Provisional Application No. 60/941,528 entitled "Null Subcarrier Placement In An OFDM Symbol Used For Synchronization" to Tarkesh Pande, Eko N. Onggosanusi and Anand G. Dabak filed on Jun. 1, 2007, which is incorporated herein by reference in its entirety.

This application claims the benefit of U.S. Provisional Application No. 60/946,283 entitled "The Use of Null Subcarriers In An OFDM Symbol Used For Synchronization" to Tarkesh Pande, Eko N. Onggosanusi and Anand G. Dabak filed on Jun. 26, 2007, which is incorporated herein by reference in its entirety.

TECHNICAL FIELD

The present disclosure is directed, in general, to a cellular communication system and, more specifically, to a transmitter, a receiver and methods of operating the transmitter and receiver.

BACKGROUND

In a cellular communications network, such as one employing orthogonal frequency division multiple access (OFDMA), each cell employs a base station that communicates with user equipment, such as a cell phone or a laptop that is actively located within its cell. When the user equipment is first turned on, it has to do an initial cell search in order to be connected to the cellular network. This involves a downlink synchronization process between the base station and the user equipment wherein the base station sends a synchronization signal to the user equipment.

As part of the synchronization process, a front-end filter may be used to filter the received signal so that only the synchronization sequence is processed. In this case, if data carrying subcarriers are chosen next to those occupied by the synchronization sequence, a low pass filter with a very short transition band is needed. This condition also has a direct implication on the front-end sampling frequencies. If the adjacent data subcarriers cannot be adequately filtered out by the low pass filter, then a greater-than-Nyquist sampling frequency (with respect to the bandwidth occupied by the synchronization sequence) may be needed. Since cellular communications systems offer increasingly greater flexibility for use, improvements would prove beneficial in the art.

SUMMARY

Embodiments of the present disclosure provide a transmitter, a receiver and methods of operating a transmitter and a receiver. In one embodiment, the transmitter is for use with a base station in a cellular communication system and includes a partitioning unit configured to provide first and second groups of guard subcarriers that partition a synchronization portion from data portions in a downlink synchronization signal. The transmitter also includes a transmit unit configured to transmit the downlink synchronization signal.

Additionally, the receiver is for use with user equipment in a cellular communication system and includes a receive unit configured to receive a downlink synchronization signal. The receiver also includes a processing unit configured to provide a synchronization portion based on employing first and second groups of guard subcarriers that partition the synchronization portion from data portions of the downlink synchronization signal.

In another aspect, the present disclosure provides a method of operating a transmitter for use with a base station in a cellular communication system. The method includes providing first and second groups of guard subcarriers that partition a synchronization portion from data portions in a downlink synchronization signal and transmitting the downlink synchronization signal.

Additionally, the present disclosure provides a method of operating a receiver for use with user equipment in a cellular communication system. The method includes receiving a downlink synchronization signal and providing a synchronization portion based on employing first and second groups of guard subcarriers that partition the synchronization portion from data portions of the downlink synchronization signal.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION OF THE DRAWINGS

For a more complete understanding of the present disclosure, reference is now made to the following descriptions taken in conjunction with the accompanying drawings, in which.

DETAILED DESCRIPTION

Next generation orthogonal frequency division multiplexing (OFDM) systems such as long-term evolution (LTE) of 3GPP, WiMAX and WLAN are designed to meet an ever increasing demand for higher data rates and better spectral efficiency. Typically, one or multiple OFDM symbols in a data frame may be used for synchronization of a base station with user equipment. These synchronization symbols, in some cases referred to as a preamble or synchronization signals or channels, have a predefined structure which is known to both the base station and user equipment. This structure maybe specified in either the time or frequency domain.

The user equipment then exploits this known structure to accomplish timing and frequency synchronization before beginning data decoding. In some OFDM systems, it is envisioned that both data and synchronization information may be sent on the same OFDM symbol in order to increase system throughput. In this disclosure it is shown that appropriate placement of guard subcarriers in a synchronization symbol allows the selection of front end filtering with a more relaxed design specification for differentiating the data subcarriers from those used for synchronization. This results further in a lower front-end sampling requirement for initial synchronization.

Furthermore, in OFDM systems where data is allocated with respect to a time-frequency resource block ($N_{BW}$ subcarriers by $N_{symb}$ OFDM symbols), introduction of guard subcarriers around the subcarriers used for synchronization in the synchronization OFDM symbol provides a natural way of viewing the synchronization sequence as part of a resource block.

An advantage of specifying the synchronization sequences as part of a resource block is that some of the guard subcarriers may be further used to carry specific control or synchronization information that can be used to improve the synchronization time and decoding complexity.

Embodiments of the present disclosure employ the use of guard subcarriers at specific locations in an OFDM symbol that is being used for synchronization. Guard subcarriers allow the use of low complexity and inexpensive front-end filters with a large transition band or low quality factor for separating the data subcarriers from those used for synchronization. Additionally, guard subcarriers allow a natural partition of an OFDM symbol into a set of subcarriers that can be used for synchronization and another set of subcarriers that can be used to transmit data. By forming this partition, at least some of the guard subcarriers may be further used to transmit additional synchronization and control information, which can improve associated decoding complexity and acquisition time.

Figure 1:
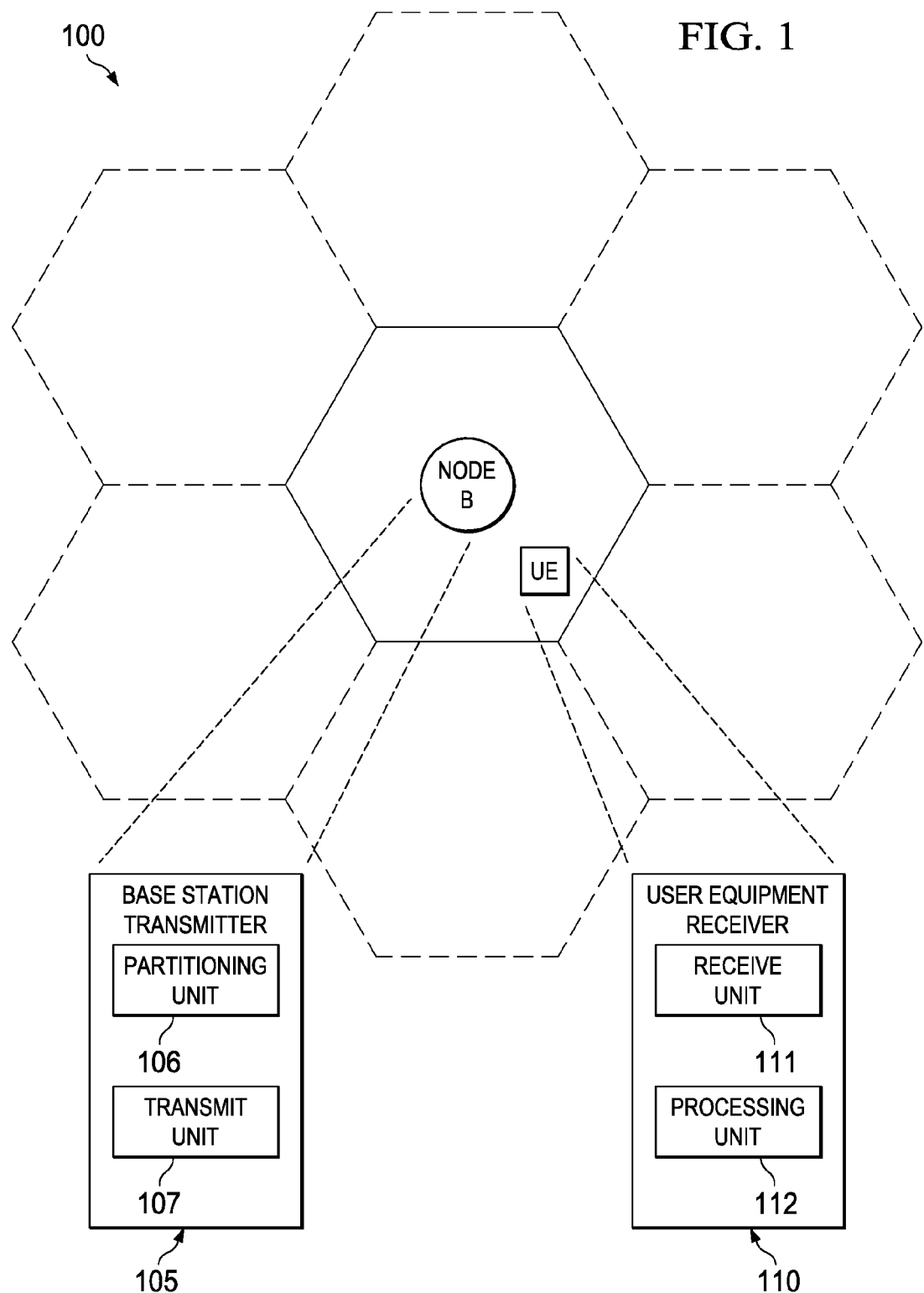
FIG. 1 illustrates an exemplary diagram of an embodiment of a cellular communication system constructed according to the principles of the present disclosure.

FIG. 1 illustrates an exemplary diagram of an embodiment of a cellular communication system 100 constructed according to the principles of the present disclosure. The cellular communication system 100 is part of an OFDMA system and shows a cellular grid having a centric communication cell surrounded by other cells. The centric communication cell employs a centric base station (i.e., a Node B). The Node B includes a base station transmitter 105 having a partitioning unit 106 and a transmit unit 107.

In the base station transmitter 105 the partitioning unit 106 is configured to provide first and second groups of guard subcarriers that partition a synchronization portion from data portions in a downlink synchronization signal. Additionally, the transmit unit 107 is configured to transmit the downlink synchronization signal.

The cellular communication system 100 also includes user equipment (UE) operating within the centric communication cell, wherein the Node B acts as a serving base station to the UE. The UE includes a UE receiver 110 having a receive unit 111 and a processing unit 112. In the UE receiver 110, the receive unit 111 is configured to receive the downlink synchronization signal from the Node B. Additionally, the processing unit 112 is configured to provide the synchronization portion based on employing first and second groups of guard subcarriers that partition the synchronization portion from data portions of the downlink synchronization signal.

Figure 2:
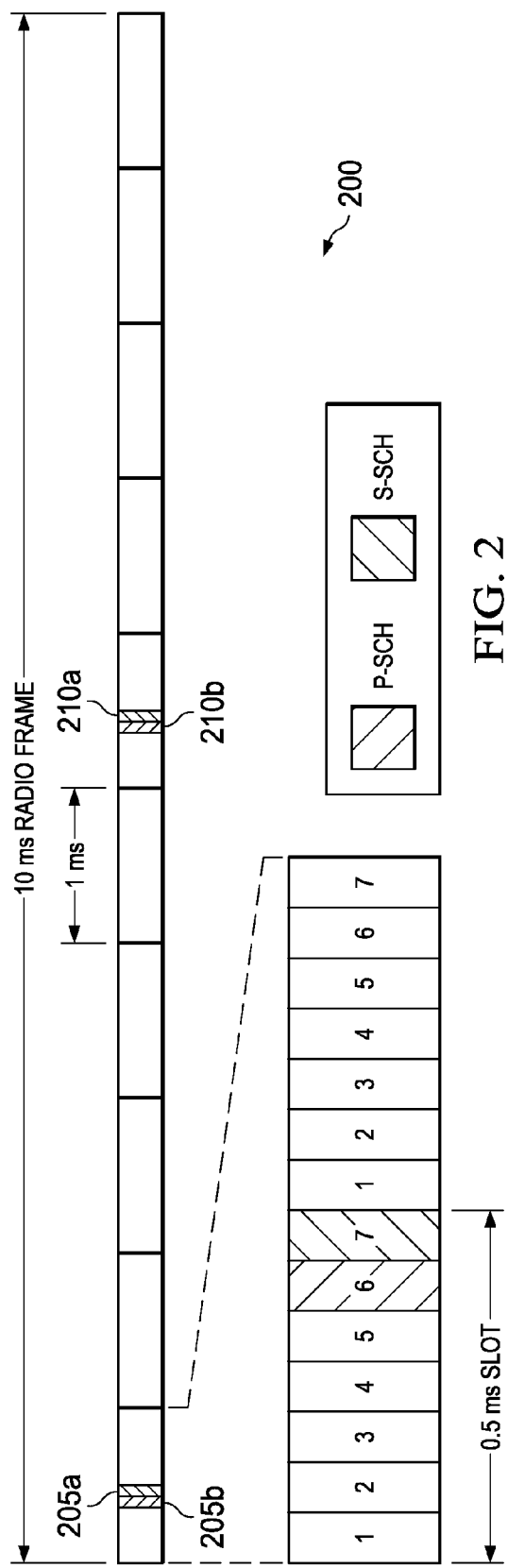
FIG. 2 illustrates a diagram of a downlink radio frame that includes a downlink synchronization signal constructed according to the principles of the present disclosure.

FIG. 2 illustrates a diagram of a downlink radio frame 200 that includes a downlink synchronization signal constructed according to the principles of the present disclosure. The downlink radio frame 200 may be employed in a cellular communication system, such as the cellular communication system 100 of FIG. 1, and includes two synchronization signals 205, 210 wherein each consists of a primary synchronization signal (also referred to as P-SCH 205a or 210a and a secondary synchronization signal (also referred to as S-SCH) 205b or 210b that are located as shown. One P-SCH 205a or 210a and one corresponding S-SCH 205b or 210b symbol are transmitted every 5 ms epoch, as shown. Design of the synchronization signals to enable fast cell search is required for LTE of 3GPP.

The underlying code for the P-SCH 205a or 210a is called a primary synchronization sequence (PSS). In one embodiment, the PSS for each cell may be chosen from three sequences and is tied to the cell identity (ID) within a certain group of cell IDs. Hence, the PSS conveys partial cell ID information and one P-SCH symbol carries three cell ID hypotheses. The underlying code for the S-SCH 205b or 210b is called the secondary synchronization sequence (SSS). The S-SCH 205b or 210b carries cell-specific information. The following cell-specific information may be carried in one S-SCH symbol.

A total of 504 cell IDs are supported in LTE. Since three cell ID hypotheses are carried in the P-SCH 205, 168 cell ID groups (168 hypotheses) are provided. Additionally, since there are two S-SCH symbols per radio frame 200 (one in the first slot, and another one in the eleventh slot), a radio frame timing indicator (2 hypotheses) may also be provided. In some embodiments, a frequency hopping indicator for a downlink reference signal (2 hypotheses) may be provided that indicates if frequency hopping is employed within the radio frame 200. Additionally, an antenna configuration of transmitter (TX) diversity indicator (2 or 3 hypotheses) may also be provided that indicates either the antenna configuration or TX diversity employed by the broadcast channel (BCH).

Figure 3:
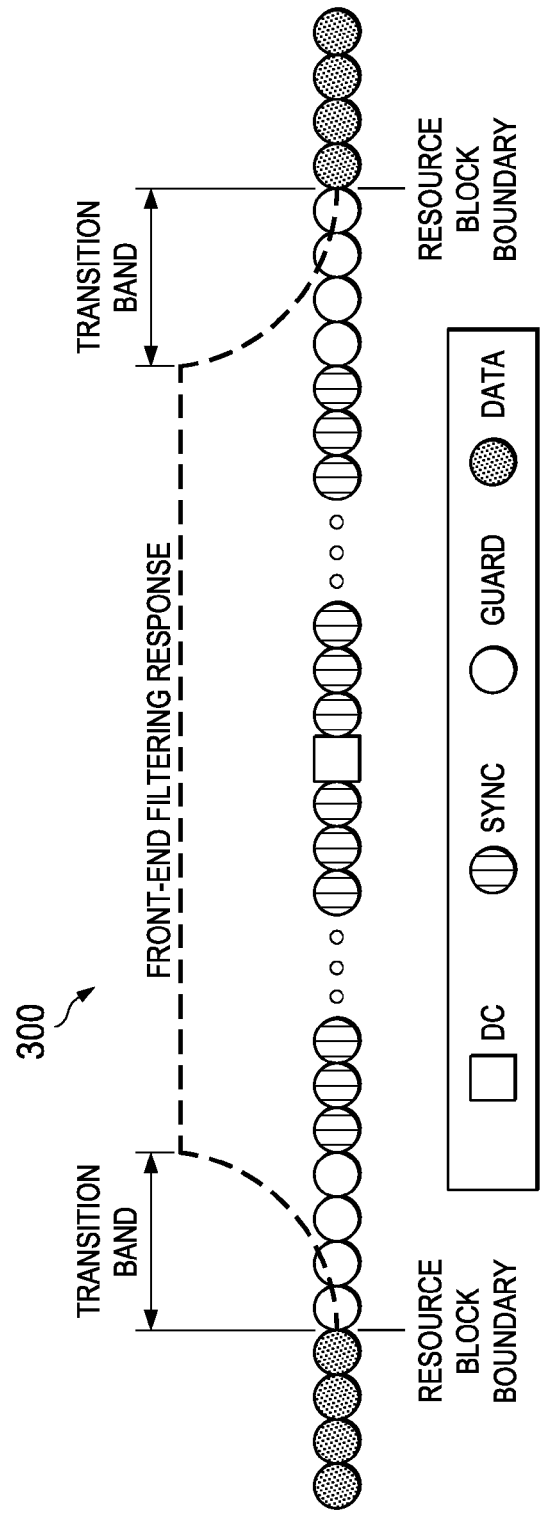
FIG. 3 illustrates an example of a front-end filtering response for a synchronization signal as provided by one embodiment of the disclosure.

FIG. 3 illustrates an example of a front-end filtering response for a synchronization signal 300 as provided by one embodiment of the disclosure. The synchronization signal 300 includes both data and synchronization portions that occupy different contiguous groups of subcarriers within the same OFDM symbol. One such example is in LTE, where either the primary or secondary synchronization sequences (PSS/SSS) are constrained to occupy a set of subcarriers around a centric DC portion. Remaining subcarriers are used as guard subcarriers that partition synchronization subcarriers from data subcarriers, as shown.

Figure 4:
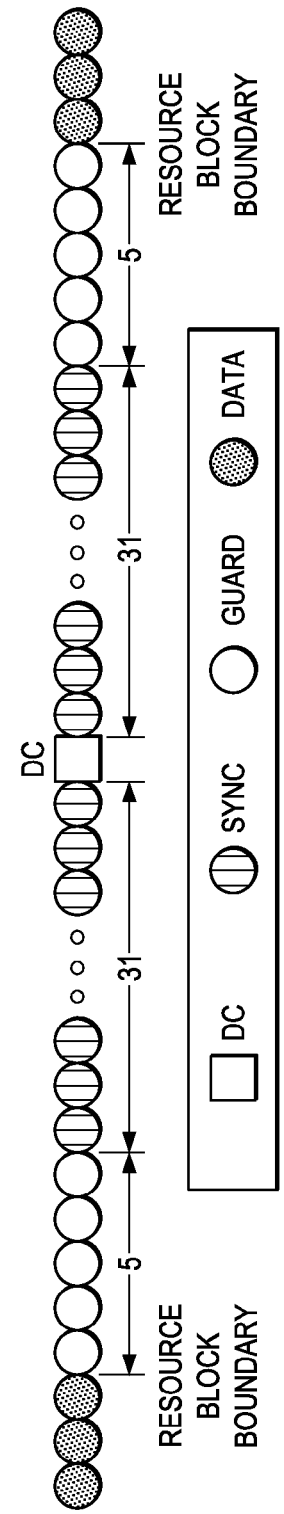
FIG. 4 illustrates a synchronization signal as provided by another embodiment of the disclosure.
Figure 5:
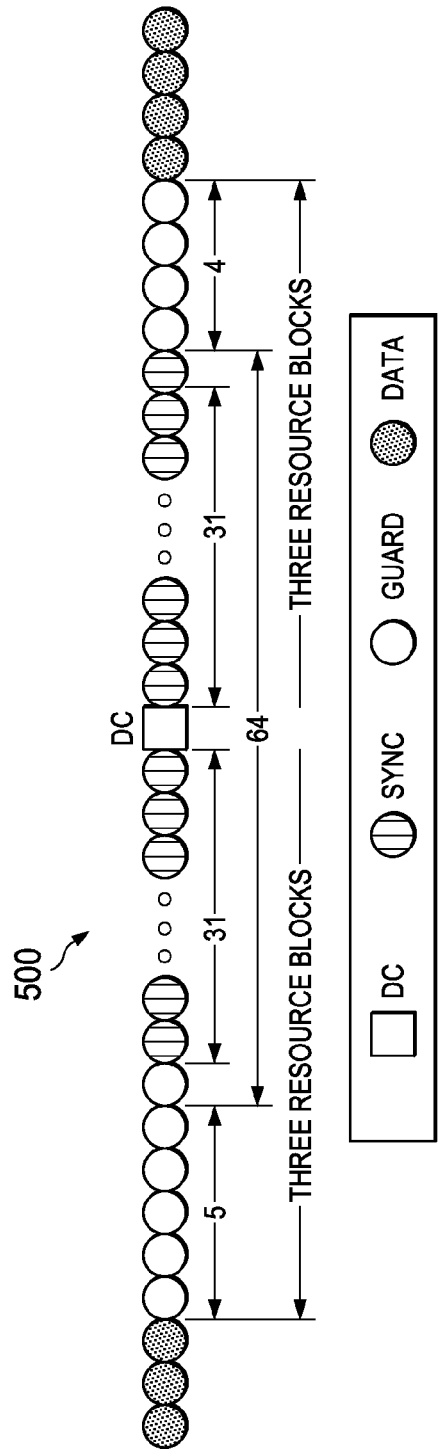
FIG. 5 illustrates a primary synchronization signal as provided by another embodiment of the disclosure.
Figure 6:
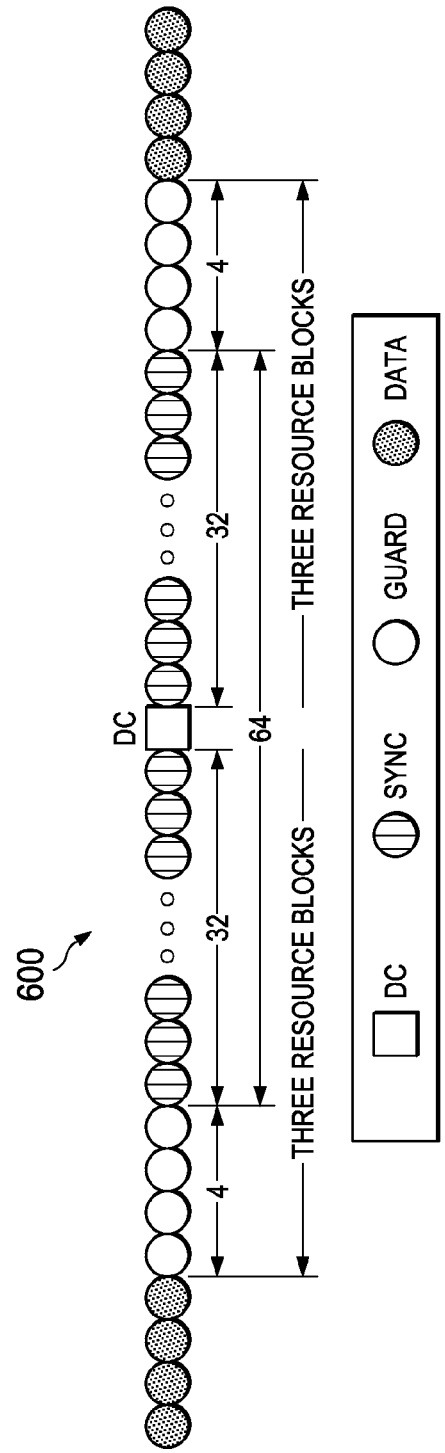
FIG. 6 illustrates a secondary synchronization signal as provided by another embodiment of the disclosure.

The guard subcarriers relax an otherwise short transition bandwidth requirement and allow an extension of the transition bands of a front-end filter used to separate the synchronization subcarriers from the data subcarriers. This arrangement also allows Nyquist rate sampling of the synchronization sequence. Alternatively, specific data symbols may be placed in these guard subcarriers to suppress the side lobes created from the subcarriers carrying the synchronization sequence. FIGS. 4, 5 and 6 are further applications of the general principles of the present disclosure that are illustrated in FIG. 3.

FIG. 4 illustrates a synchronization signal 400 as provided by another embodiment of the disclosure. The synchronization signal 400 may be employed for either primary or secondary synchronization. In the illustrated embodiment, each of the first and second groups of guard subcarriers contains a same number of guard subcarriers around the synchronization portion, as was presented as a general structure in FIG. 3. However, in this embodiment, the same number of guard subcarriers may be seen to be equal to five. Additionally, the synchronization portion contains 31 contiguous synchronization subcarriers on each side of a centric DC portion.

FIG. 5 illustrates a primary synchronization signal 500 as provided by another embodiment of the disclosure. FIG. 5 depicts an example for the primary synchronization signal where five and four guard subcarriers are used on the left and right sides of the center 64 subcarriers, respectively. As discussed previously, in some OFDM systems data is allocated with respect to a time-frequency resource block ($N_{BW}$ subcarriers by $N_{symb}$ OFDM symbols). In LTE, as an example, a resource block may be specified as occupying 12 consecutive active subcarriers for a carrier spacing of 15 kHz.

Furthermore, a primary synchronization sequence in LTE may be specified to occupy the center 64 subcarriers (including DC) in the corresponding synchronization symbol where the DC is punctured. By placing respectively first and second groups of five and four guard subcarriers on either side of the subcarriers used for primary synchronization (64−1+4+5=72, where −1 accounts for the unused DC subcarrier), the primary synchronization sequence can also be viewed as part of the resource block allocation process. This allows the remaining data subcarriers to be placed into contiguous resource blocks. This also holds when the primary synchronization sequence occupies only 62 or 63 out of the 64 center subcarriers shown. In this case, the number of guard subcarriers is chosen such that the center 72 active subcarriers are reserved for the primary synchronization sequence.

Note that FIG. 5 illustrates a concept which applies to a more generic condition or setup and other variations (e.g., four and five guard subcarriers on the left and right sides respectively), wherein the primary synchronization sequence occupies all 63 active subcarriers.

FIG. 6 illustrates a secondary synchronization signal 600 as provided by another embodiment of the disclosure. In the illustrated embodiment, secondary synchronization sequence occupancy may be seen to exceed the center 64 subcarriers wherein one secondary synchronization sequence subcarrier lies outside the center 64 subcarriers. However, insertion of the guard subcarriers still applies, and four guard subcarriers are used on the left and right sides of the secondary synchronization sequences, as shown.

With the above partitioning of the OFDM symbol used for synchronization into a resource block, some of the guard subcarriers in the resource block where the synchronization sequence lies may also be used to transmit specific control or synchronization information.

In LTE, for example, the primary broadcast channel (P-BCH) frame timing information will have a periodicity of 40 ms. Since the P-BCH is transmitted every radio frame of length 10 ms, control information resolving the ambiguity of which of the four radio frames is being decoded can also be transmitted. An alternate example of control information that could be transmitted is the transmit diversity indicator information. Here, there are three possibilities corresponding to one, two or four transmit antennas being used by the Node B.

In the example above, there are a total of 12 possibilities (four for resolving frame timing for P-BCH times and three for transmit diversity indicator information) corresponding to a minimum of four bits of information that needs to be transmitted. These four bits may be encoded using a coding scheme and transmitted on the guard subcarriers in the synchronization resource block. The encoding scheme can be designed such that soft combining over multiple subframes is possible.

It may be noted that the above approach is not the only way of sending transmit diversity or P-BCH information in the synchronization resource block. An alternative approach is to represent the corresponding bits to the above information in terms of a modulation symbol α, which may be chosen from a complex constellation such as the one shown below.

$$\left[ \frac{(1+j)}{\sqrt{2}}, \frac{(1-j)}{\sqrt{2}}, \frac{(-1+j)}{\sqrt{2}}, \frac{(-1-j)}{\sqrt{2}} \right]$$

This symbol is then employed to multiply or modulate the synchronization sequence. In LTE, this symbol may be used to modulate both the primary and secondary synchronization signals. At the receiver after primary and secondary synchronization and channel estimation is accomplished, the UE may then form an estimate of the symbol α. Various approaches may be used to demodulate α.

Figure 7:
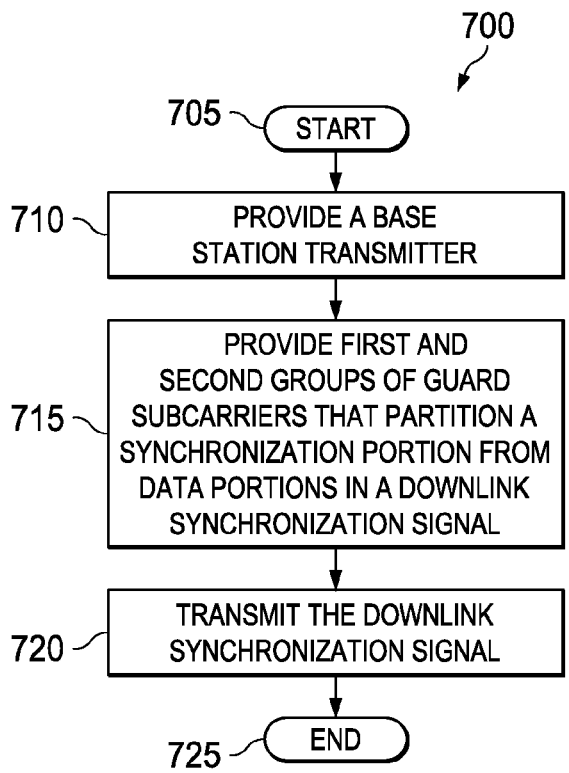
FIG. 7 illustrates a flow diagram of a method of operating a transmitter carried out according to the principles of the disclosure.

FIG. 7 illustrates a flow diagram of a method of operating a transmitter 700 carried out according to the principles of the disclosure. The method 700 is for use with a base station in a cellular communication system and starts in a step 705. Then, a base station transmitter is provided in a step 710, and first and second groups of guard subcarriers are then provided that partition a synchronization portion from data portions in a downlink synchronization signal, in a step 715. The first and second groups of guard subcarriers are provided in a primary synchronization signal or a secondary synchronization signal.

In one embodiment, each of the first and second groups of guard subcarriers contains a same number of guard subcarriers around the synchronization portion. Additionally the same number of guard subcarriers is equal to five, and the synchronization portion contains 31 contiguous synchronization subcarriers on each side of a centric DC portion.

In one embodiment, at least one of the first and second groups of guard subcarriers contains a same number of guard subcarriers around the synchronization portion for the primary and secondary synchronization signals. Additionally, the same number of guard subcarriers is equal to five.

In one embodiment, each of the first and second groups of guard subcarriers extends subcarriers to a resource block boundary that separates the synchronization portion and the data portion. Additionally, the synchronization portion and the first and second groups of guard subcarriers occupy a center 72 subcarriers.

In one embodiment, at least a portion of the first and second groups of guard subcarriers are null subcarriers. Alternatively, control information is provided by at least a portion of the first and second groups of guard subcarriers. The control information provides a transmit diversity indication or a frame timing indication for a P-BCH.

In one embodiment, control information is provided by a modulation symbol that modulates the synchronization portion. Additionally, the modulating symbol is represented by bits of control information chosen from a complex constellation. The downlink synchronization signal is transmitted in a step 720, and the method 700 ends in a step 725.

Figure 8:
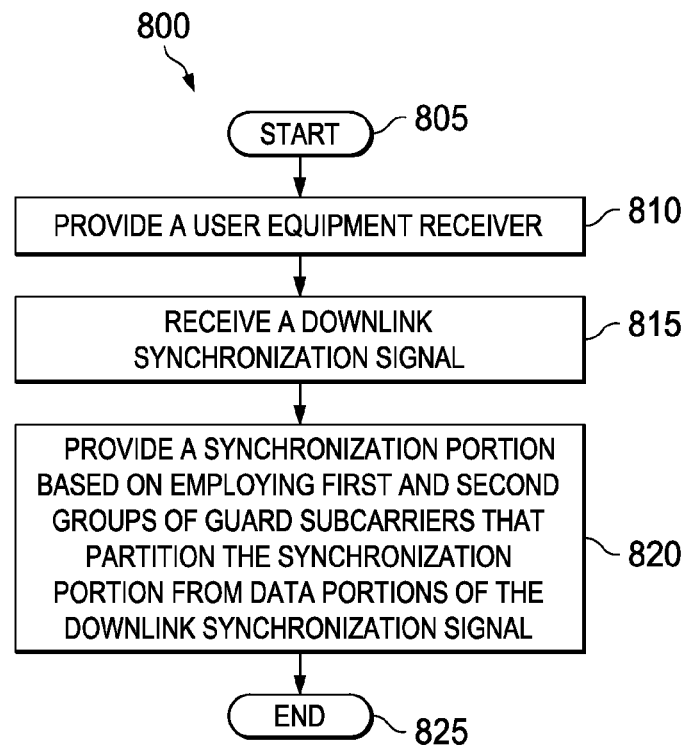
FIG. 8 illustrates a flow diagram of a method of operating a receiver carried out according to the principles of the disclosure.

FIG. 8 illustrates a flow diagram of a method of operating a receiver 800 carried out according to the principles of the present disclosure. The method 800 is for use with user equipment in a cellular communication system and starts in a step 805. Then, a user equipment receiver is provided in a step 810, and a downlink synchronization signal is received in a step 815. A synchronization portion is provided based on employing first and second groups of guard subcarriers that partition the synchronization portion from data portions of the downlink synchronization signal, in a step 820.

The first and second groups of guard subcarriers are provided in a primary synchronization signal or a secondary synchronization signal. In one embodiment, the synchronization portion is provided by front-end filtering having transition bands defined by the first and second groups of guard subcarriers.

In one embodiment, each of the first and second groups of guard subcarriers contains a same number of guard subcarriers around the synchronization portion. Additionally, the same number of guard subcarriers is equal to five. Correspondingly, the synchronization portion contains 31 contiguous synchronization subcarriers on each side of a centric DC portion.

In one embodiment, at least one of the first and second groups of guard subcarriers contains a same number of guard subcarriers around the synchronization portion for primary and secondary synchronization signals. Additionally, the same number of guard subcarriers is equal to five.

In one embodiment, each of the first and second groups of guard subcarriers extends subcarriers to a resource block boundary separating the synchronization portion and the data portion. Additionally, the synchronization portion and the first and second groups of guard subcarriers occupy a center 72 subcarriers.

In one embodiment, at least a portion of the first and second groups of guard subcarriers are null subcarriers. Additionally, control information is provided by at least a portion of the first and second groups of guard subcarriers. Correspondingly, the control information provides a transmit diversity indication or a frame timing indication for a P-BCH.

In one embodiment, control information is provided by a modulation symbol that modulates the synchronization portion. Additionally, the modulating symbol is represented by bits of control information chosen from a complex constellation. The method 800 ends in a step 825.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which the disclosure relates will appreciate that other and further additions, deletions, substitutions and modifications may be made to the described example embodiments without departing from the disclosure.

What is claimed is:

1. A transmitter for use with a base station in a cellular communication system, comprising:
   a partitioning unit configured to provide first and second groups of guard subcarriers that partition a synchronization portion from data portions in a downlink synchronization signal, each of the first and second groups of guard subcarriers containing five guard subcarriers around the synchronization portion; and
   a transmit unit configured to transmit the downlink synchronization signal.

2. The transmitter as recited in claim 1 wherein the first and second groups of guard subcarriers are provided in a primary synchronization signal or a secondary synchronization signal.

3. The transmitter as recited in claim 1 wherein the synchronization portion contains 31 contiguous synchronization subcarriers on each side of a centric Direct Current (DC) portion.

4. The transmitter as recited in claim 1 wherein at least one of the first and second groups of guard subcarriers contains a same number of guard subcarriers around the synchronization portion for primary and secondary synchronization signals.

5. The transmitter as recited in claim 4 wherein the same number of guard subcarriers is equal to five.

6. The transmitter as recited in claim 1 wherein each of the first and second groups of guard subcarriers extends subcarriers to a resource block boundary separating the synchronization portion and the data portion.

7. The transmitter as recited in claim 1 wherein the synchronization portion and the first and second groups of guard subcarriers occupy a center 72 subcarriers.

8. The transmitter as recited in claim 1 wherein at least a portion of the first and second groups of guard subcarriers are null subcarriers.

9. The transmitter as recited in claim 1 wherein control information is provided by at least a portion of the first and second groups of guard subcarriers.

10. The transmitter as recited in claim 9 wherein the control information provides a transmit diversity indication.

11. The transmitter as recited in claim 9 wherein the control information provides a frame timing indication for the Primary Broadcast Channel (P-BCH).

12. The transmitter as recited in claim 1 wherein control information is provided by a modulation symbol that modulates the synchronization portion.

13. The transmitter as recited in claim 12 wherein the modulating symbol is represented by bits of control information chosen from a complex constellation.

14. A method of operating a transmitter for use with a base station in a cellular communication system, comprising:
   providing first and second groups of guard subcarriers that partition a synchronization portion from data portions in a downlink synchronization signal, each of the first and second groups of guard subcarriers containing five guard subcarriers around the synchronization portion; and
   transmitting the downlink synchronization signal.

15. The method as recited in claim 14 wherein the first and second groups of guard subcarriers are provided in a primary synchronization signal or a secondary synchronization signal.

16. The method as recited in claim 14 wherein the synchronization portion contains 31 contiguous synchronization subcarriers on each side of a centric Direct Current (DC) portion.

17. The method as recited in claim 14 wherein at least one of the first and second groups of guard subcarriers contains a same number of guard subcarriers around the synchronization portion for primary and secondary synchronization signals.

18. The method as recited in claim 17 wherein the same number of guard subcarriers is equal to five.

19. The method as recited in claim 14 wherein each of the first and second groups of guard subcarriers extends subcarriers to a resource block boundary separating the synchronization portion and the data portion.

20. The method as recited in claim 14 wherein the synchronization portion and the first and second groups of guard subcarriers occupy a center 72 subcarriers.

21. The method as recited in claim 14 wherein at least a portion of the first and second groups of guard subcarriers are null subcarriers.

22. The method as recited in claim 14 wherein control information is provided by at least a portion of the first and second groups of guard subcarriers.

23. The method as recited in claim 22 wherein the control information provides a transmit diversity indication.

24. The method as recited in claim 22 wherein the control information provides a frame timing indication for the Primary Broadcast Channel (P-BCH).

25. The method as recited in claim 14 wherein control information is provided by a modulation symbol that modulates the synchronization portion.

26. The method as recited in claim 25 wherein the modulating symbol is represented by bits of control information chosen from a complex constellation.

27. A receiver for use with user equipment in a cellular communication system, comprising:
a receive unit configured to receive a downlink synchronization signal; and
a processing unit configured to provide a synchronization portion based on employing first and second groups of guard subcarriers that partition the synchronization portion from data portions of the downlink synchronization signal, each of the first and second groups of guard subcarriers containing five guard subcarriers around the synchronization portion.

28. The receiver as recited in claim 27 wherein the synchronization portion is provided by front-end filtering having transition bands defined by the first and second groups of guard subcarriers.

29. The receiver as recited in claim 27 wherein the first and second groups of guard subcarriers are provided in a primary synchronization signal or a secondary synchronization signal.

30. The receiver as recited in claim 27 wherein the synchronization portion contains 31 contiguous synchronization subcarriers on each side of a centric Direct Current (DC) portion.

31. The receiver as recited in claim 27 wherein at least one of the first and second groups of guard subcarriers contains a same number of guard subcarriers around the synchronization portion for primary and secondary synchronization signals.

32. The receiver as recited in claim 31 wherein the same number of guard subcarriers is equal to five.

33. The receiver as recited in claim 27 wherein each of the first and second groups of guard subcarriers extends subcarriers to a resource block boundary separating the synchronization portion and the data portion.

34. The receiver as recited in claim 27 wherein the synchronization portion and the first and second groups of guard subcarriers occupy a center 72 subcarriers.

35. The receiver as recited in claim 27 wherein at least a portion of the first and second groups of guard subcarriers are null subcarriers.

36. The receiver as recited in claim 27 wherein control information is provided by at least a portion of the first and second groups of guard subcarriers.

37. The receiver as recited in claim 36 wherein the control information provides a transmit diversity indication.

38. The receiver as recited in claim 36 wherein the control information provides a frame timing indication for the Primary Broadcast Channel (P-BCH).

39. The receiver as recited in claim 27 wherein control information is provided by a modulation symbol that modulates the synchronization portion.

40. The receiver as recited in claim 39 wherein the modulating symbol is represented by bits of control information chosen from a complex constellation.

41. A method of operating a receiver for use with user equipment in a cellular communication system, comprising:
receiving a downlink synchronization signal; and
providing a synchronization portion based on employing first and second groups of guard subcarriers that partition the synchronization portion from data portions of the downlink synchronization signal, each of the first and second groups of guard subcarriers containing five guard subcarriers around the synchronization portion.

42. The method as recited in claim 41 wherein the synchronization portion is provided by front-end filtering having transition bands defined by the first and second groups of guard subcarriers.

43. The method as recited in claim 41 wherein the first and second groups of guard subcarriers are provided in a primary synchronization signal or a secondary synchronization signal.

44. The method as recited in claim 41 wherein the synchronization portion contains 31 contiguous synchronization subcarriers on each side of a centric Direct Current (DC) portion.

45. The method as recited in claim 41 wherein at least one of the first and second groups of guard subcarriers contains a same number of guard subcarriers around the synchronization portion for primary and secondary synchronization signals.

46. The method as recited in claim 45 wherein the same number of guard subcarriers is equal to five.

47. The method as recited in claim 41 wherein each of the first and second groups of guard subcarriers extends subcarriers to a resource block boundary separating the synchronization portion and the data portion.

48. The method as recited in claim 41 wherein the synchronization portion and the first and second groups of guard subcarriers occupy a center 72 subcarriers.

49. The method as recited in claim 41 wherein at least a portion of the first and second groups of guard subcarriers are null subcarriers.

50. The method as recited in claim 41 wherein control information is provided by at least a portion of the first and second groups of guard subcarriers.

51. The method as recited in claim 50 wherein the control information provides a transmit diversity indication.

52. The method as recited in claim 50 wherein the control information provides a frame timing indication for the Primary Broadcast Channel (P-BCH).

53. The method as recited in claim 41 wherein control information is provided by a modulation symbol that modulates the synchronization portion.

54. The method as recited in claim 53 wherein the modulating symbol is represented by bits of control information chosen from a complex constellation.

* * * * *